No. 818,857. PATENTED APR. 24, 1906.
G. A. SCHULTZ.
WHEEL FOR VEHICLES.
APPLICATION FILED APR. 17, 1905.
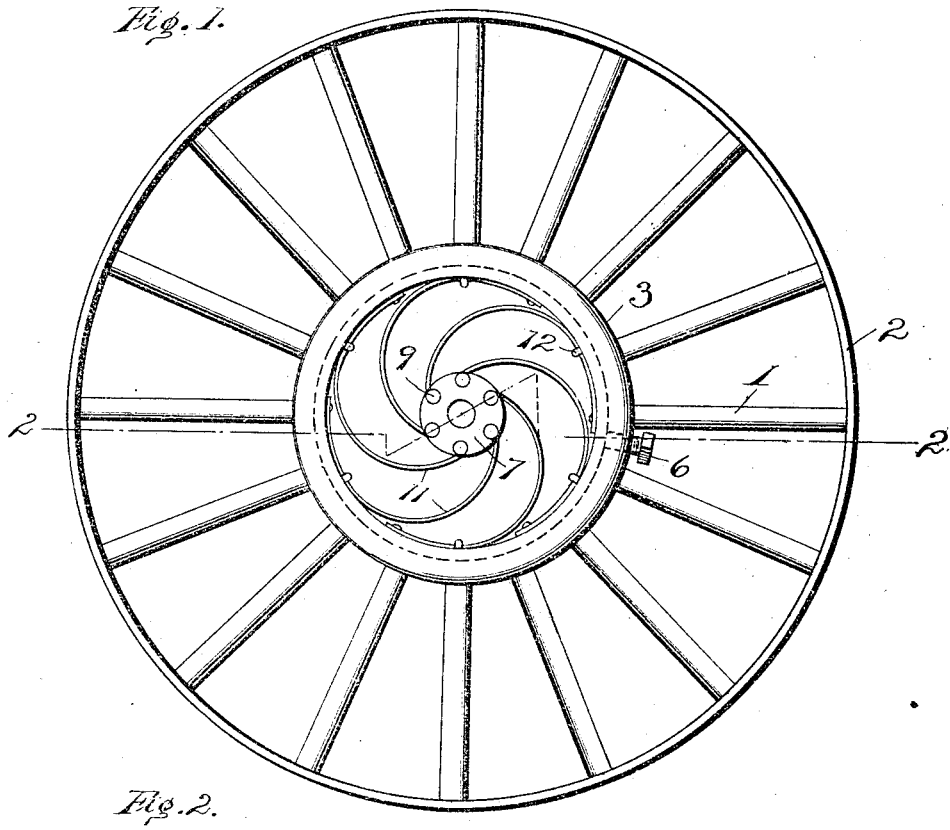
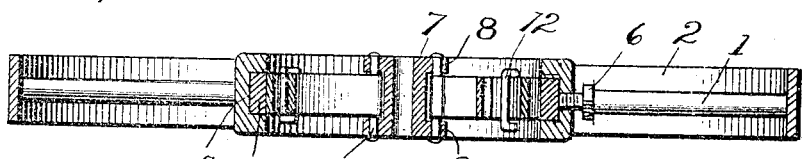
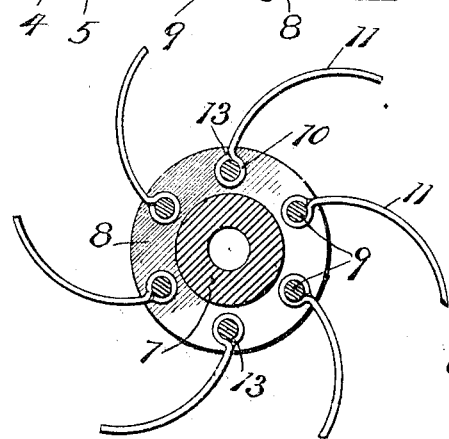
Inventor
Gus. A. Schultz.
Witnesses
W. P. Taylor.
Herbert D. Lawson.
By W. T. Fitzgerald & Co.,
Attorneys

UNITED STATES PATENT OFFICE.

GUSTAVE A. SCHULTZ, OF HAWKEYE, IOWA.

WHEEL FOR VEHICLES.

No. 818,857.     Specification of Letters Patent.     Patented April 24, 1906.

Application filed April 17, 1905. Serial No. 255,971.

*To all whom it may concern:*

Be it known that I, GUSTAVE A. SCHULTZ, a citizen of the United States, residing at Hawkeye, in the county of Fayette and State of Iowa, have invented certain new and useful Improvements in Wheels for Vehicles; and I do hereby declare the following to be a full, clear, and exact description of the invention, such as will enable others skilled in the art to which it appertains to make and use the same.

My invention relates to wheels for vehicles; and its object is to provide a device of this character having a spring-supported hub, whereby rubber tires such as are ordinarily employed may be dispensed with, but all the beneficial results accruing from the use of such tires retained.

Another object is to provide means whereby the spring-supports of the hub may be tensioned to support different weights, thereby rendering the wheel serviceable for either light or heavy vehicles.

With the above and other objects in view the invention consists of a wheel the spokes of which are connected at their inner ends to a ring which surrounds the hub of the wheel, but is spaced therefrom. Similarly-disposed bow-springs are connected to the hub at regular intervals and are fastened at their outer ends to the ring. Means are provided whereby the tension of all the springs may be simultaneously increased or diminished.

The invention also consists of the further novel constructions and combinations of parts hereinafter more fully described, and pointed out in the claims.

In the accompanying drawings I have shown the preferred form of my invention.

In said drawings, Figure 1 is a side elevation of a wheel constructed in accordance with my invention. Fig. 2 is a section on line 2 2, Fig. 1; and Fig. 3 is an enlarged section through the hub, showing the manner of connecting the springs thereto.

Referring to the figures by numerals of reference, 1 1 are the spokes which connect the rim 2 of the wheel with a ring 3, having a continuous groove 4 in its inner face, which constitutes a seat for an adjusting-ring 5. This ring is held normally against movement within the groove by means of a set-screw 6, which extends through ring 3 and is adapted to clamp on the adjusting-ring 5. A hub 7, having annular flanges 8 at the ends thereof, is surrounded by the rings 3 and 5 and has holding-pins 9, which are mounted in the flanges 8 and extend through eyes 10, formed at one end of bow-springs 11. These springs are all similar and project through holding-loops 12, which are secured to the ring 3, and the outer ends of the springs are fastened in any desired manner to the adjusting-ring 5. By referring to Fig. 3 it will be noticed that the eyes 10 are so formed in relation to the main portions of the springs 11 that when the ends of the springs are pressed toward each other the inner ends 13 thereof form braces for the main or body portions of the springs, and there is no danger of the eyes 10 being forced open, as would be the case if pressure upon the springs had a tendency to force the main portions thereof away from the ends 13.

It will of course be understood that by shortening the distance between the pin 9 and holding-loop 12 of each spring 11 said spring will be capable of supporting a heavier weight than by increasing the distance between said points. Therefore if it is desired to adjust the tension of the springs so as to adapt the wheel for use upon heavy vehicles the set-screw 6 is loosened from ring 5 and said ring is rotated within the groove 4, so as to draw the springs 11 a desired distance through their respective loops 12. Ring 5 can then be quickly locked against further movement by means of the set-screw 6. If it is desired to increase the length of the working portions of the springs, so as to adapt the wheel for use on light vehicles, the ring 5 can be turned in the opposite direction, so as to bring the outer ends of the springs close to their respective retaining-loops 12. It will be noted that the ring 5 is rotatable within the groove 4, but is always held concentric with the ring 3 and is prevented from moving laterally within the groove 4 by the side walls of said groove. The resilient area of the springs 11 can therefore be increased or diminished without moving any portion of said springs laterally. Instead the hub 1 is always maintained in the same relation to the plane in which ring 3 is disposed.

It will be seen that this wheel is very simple and very inexpensive in construction and embodies all the advantages incident to the use of pneumatic tires. It has the further advantage, however, in that the resiliency of the wheel can be adjusted to suit different kinds of vehicles, whereas when pneumatic tires are employed this result can only be obtained by employing different tires or increasing the air-pressure within the tires.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. A wheel embodying in its structure a series of springs, rotatable means for simultaneously increasing or diminishing the resilient area of the springs, and means for preventing movement of said means laterally in relation to the wheel.

2. A wheel comprising a ring, a rim connected thereto, a hub, an adjusting-ring movably connected to the first-mentioned ring, springs secured at opposite ends to the hub and adjusting-ring, and means for locking the adjusting-ring against movement.

3. A wheel comprising a ring, a rim connected thereto, a hub, springs connected to the hub, means for holding the springs upon the ring, and means for sliding the springs within the ring.

4. A wheel comprising a ring and a rim connected thereto, a hub, springs connecting the hub and ring, and means for simultaneously increasing or diminishing the tension of the springs, said means being held against lateral and longitudinal movement by the ring.

5. A wheel comprising a ring and a rim connected thereto, a hub, bow-springs connected to the hub and ring, and means for simultaneously increasing or diminishing the tension of the springs, said means being held against lateral and longitudinal movement by the ring.

6. A wheel comprising a ring and a rim connected thereto, a hub, bow-springs extending from the hub and slidably connected to the ring, and means within the ring for simultaneously operating the springs to increase or diminish their tension.

7. A wheel comprising a ring and a rim connected thereto, a hub, bow-springs extending from the hub, retaining-loops secured to the ring and forming guides for the springs, and means for drawing the springs simultaneously through the loops.

8. A wheel comprising a ring and a rim connected thereto, a hub, bow-springs extending from the hub, retaining-loops secured to the ring and forming guides for the springs, means for simultaneously moving the springs through the loops and a locking device for said means.

9. A wheel comprising a ring and a rim connected thereto, a hub, bow-springs extending from the hub, holding-loops secured to the ring and forming guides for the springs, an adjusting-ring surrounding and secured to the springs, and means for locking said ring against movement.

10. A wheel comprising a grooved ring and a rim connected thereto, a hub, bow-springs extending from the hub, retaining-loops secured to the ring and forming guides for the springs, an adjusting-ring rotatably mounted within the groove and secured to the springs, and means for locking the adjusting-ring against movement.

In testimony whereof I have signed my name to this specification in the presence of two subscribing witnesses.

GUS A. SCHULTZ.

Witnesses:
ALBERT G. KOHLMEYER,
AUGUST F. REHWINKEL.